(12) United States Patent
Davis et al.

(10) Patent No.: US 9,723,278 B2
(45) Date of Patent: Aug. 1, 2017

(54) COLOR DISPLAY PROJECTION METHOD AND APPARATUS

(71) Applicant: Texas Instruments Incorporated, Dallas, TX (US)

(72) Inventors: Michael T. Davis, Richardson, TX (US); Steven E. Smith, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/281,393

(22) Filed: May 19, 2014

(65) Prior Publication Data
US 2014/0340650 A1    Nov. 20, 2014

Related U.S. Application Data

(60) Provisional application No. 61/824,726, filed on May 17, 2013.

(51) Int. Cl.
*G03B 21/26* (2006.01)
*H04N 9/31* (2006.01)

(52) U.S. Cl.
CPC .......... *H04N 9/3105* (2013.01); *H04N 9/315* (2013.01)

(58) Field of Classification Search
CPC .......... G02B 26/08; G03B 21/26; G03B 21/18
USPC ................................. 353/33, 99, 37
See application file for complete search history.

(56) References Cited

U.S. PATENT DOCUMENTS

| | | | | |
|---|---|---|---|---|
| 5,241,407 A | * | 8/1993 | Sonehara | G02B 27/145 348/758 |
| 6,028,689 A | * | 2/2000 | Michalicek | G02B 26/0841 359/223.1 |
| 2002/0085133 A1 | * | 7/2002 | Ho | G02B 27/283 349/25 |
| 2005/0057729 A1 | * | 3/2005 | Huang | G03B 21/005 353/33 |
| 2009/0009730 A1 | * | 1/2009 | Destain | G03B 21/28 353/84 |

* cited by examiner

*Primary Examiner* — Steven H Whitesell Gordon
*Assistant Examiner* — Jerry Brooks
(74) *Attorney, Agent, or Firm* — Michael A. Davis, Jr.; Charles A. Brill; Frank D. Cimino

(57) ABSTRACT

A multi-DMD projection system uses an extended X-cube color splitting/recombining prism to implement splitting and recombining functions at different sections of the cube. Light directed from a white light source is split into red, green and blue components in a lower section of the cube. The components are directed to respective first, second and third DMDs for separate modulations and reentered into the X-cube prism by TIR prism for recombining at an upper section of the cube.

4 Claims, 16 Drawing Sheets

COLOR DISPLAY PROJECTION METHOD AND APPARATUS

This application claims the benefit of Provisional Application No. 61/824,726, filed May 17, 2013, and the entirety of which is hereby incorporated by reference.

This relates to apparatus and methods for the color display of images.

BACKGROUND

Displays of the type to which this disclosure finds application include multiple color image projection systems that employ two or more spatial light modulators (SLMs), such as Texas Instruments DLP® digital micromirror device (DMD) light modulators. The architecture and operation of such micromirror devices is described in more detail in Texas Instruments Application No. 61/823,304 filed May 14, 2013, entitled "Micromirror Apparatus and Methods," the entirety of which is incorporated herein by reference.

Multiple DMD (3-chip typical) systems using conventional +/−12-degree ("ON"-state/"OFF"-state) tilting mirror pixels arranged in a Manhattan-type array use a Philips-type color separation prism ("Philips prism") to split white light from an illumination source into constituent RGB color components to respective DMDs, and to recombine the separately modulated colors into a composite complete RGB image for projection onto a display surface. Changes in the illumination angle vs. projection angle on the prism dichroic color filters results in spectral losses in the output, and separation of s- and p-polarizations on the dichroic color filters. A single total internal reflection (TIR) prism is used between the projection lens and the Phillips prism to inject the light at a 45-degree orientation to the DMD's, therefore each DMD has to be oriented to the light path in the same direction. Since tow of the three colors will split and/or recombine by reflection from the (normally) green straight-thru path, those reflected colors (red and blue) have to undergo an even number of reflections (typically two) to maintain correct orientation of the incoming light to the DMDs. Thus the red and blue paths are significantly longer in a DMD projection system Philips prism compared to, for example, an x-cube type prism used in other technologies. Also, in order to provide a same path length in the glass for all colors, the green path may become relatively much longer in order to match the red and blue paths. Since the outgoing projected light must pass again through the TIR prism at the front and then into the projection lens, the cones of light coming into the TIR prism from the long path of the Phillips prism have now expanded significantly since leaving the respective DMDs. This makes the TIR prism significantly larger than desirable for the illumination path, to prevent vignetting of the projected image bundles. Also, the illumination bundles in the prism are folded about the diagonal dimension of the DMD due to the corner-Manhattan pixel architecture having a diagonal hinge. This increases the size of the prisms. And since color-splitting (illumination path) and color-combining (projection path) occurs in the same space in the same prisms, there are significantly more stray light paths to manage, which can increase the path lengths required. The net result is that the projection path length in glass for the prism sets for multi-chip DMD projectors using corner-Manhattan array layout devices may be significantly longer than required for some other technologies, resulting in significantly longer back-working-distance requirements for the projection lenses. This has an impact on the resulting size, performance, and cost of the projection lenses. It unnecessarily complicates the design by requiring retro-focus lens designs in which the focal length of the lens is significantly shorter than the back working distance of the lens, requiring more complicated designs with more lens elements which may degrade performance and/or increase cost.

A conventional x-cube type prism is not practical for current multi-chip DMDs for two reasons. First, the number of reflections for blue and red channels is odd (one instead of two), requiring a different orientation of the DMD relative to the incoming light, which is at an angle to the optical axis. This is difficult to implement with a single TIR prism feeding the input light to the color splitting prism. And, second, typical x-cube dichroics only have to deal with one polarization of light for other technologies, so the coatings do not have to minimize separation of the s- and p-polarizations for color fidelity since there is only one polarization to begin with.

In DMD projection systems, the light is randomly polarized, so the s- and p-polarization split may cause light from one or another of the polarized components to leak across the filter, thereby contaminating the color purity of the other channels. For instance, some blue light may leak into the green channel, some red light may leak into the green channel, and some green light may leak into the red and blue channels, which reduces the color fidelity and gamut. This separation effect may be minimized with higher cost dichroic coatings, but not totally eliminated.

A smaller, lower cost solution would enable lower-cost, smaller-screen cinema markets as well as high performance, economical multi-chip home theatre and professional projection applications.

SUMMARY

Color display projection methods and apparatus and apparatus are provided with particular application to multi-channel color separated spatial light modulation systems.

In a disclosed example embodiment, a projection system employing multiple DMD having two-axis tilt pixel modulator elements and an X-cube color prism for a white light source application provides reduction in optical path length and cost, better contrast and improved thermal management over existing systems. Individual total internal reflection (TIR) or reverse total internal reflection (RTIR) prisms are used in each color channel between the respective color modulating DMD and the color combining prism, instead of one large TIR or RTIR between the illuminating light relay lens and the color prism (previously, typically, Philips prism). The described arrangement enables clean-up color filtering for each color, moves the "OFF"-state and flat-state mirror position light further away from the projection lens aperture, and eliminates the need for even numbers of reflections in the prism or left- and right-handed DMDs. Light is split and later recombined using the same cube and exactly the same color filters, but in different sections of the prism. This enables polarization induced leakage across the color filters to be eliminated and avoids color gamut desaturation.

The use of two-axis tilted mirror pixels, such as those disclosed in Application No. 61/823,304, allows bottom illumination, which allows the light path to be folded across the shortest dimension of the DMD (instead of the diagonal as in previous versions). This greatly reduces optical path distances to the projection lens by reducing prism sizes, thus reducing lens size and cost.

DETAILED DESCRIPTION

Conventional three DMD chip designs with +/−12-degree tilting pixels with corner-Manhattan hinge configurations and a single TIR prism in front of a Philips type color splitting/combining prism have long back working distances to avoid left- and right-handed devices. Combined with illuminating across the diagonal dimension of the device, this drives up the size and cost of both the prisms and the projection lenses. Described examples provide methods and apparatus that enable more compact less complex implementations.

Figure 1:
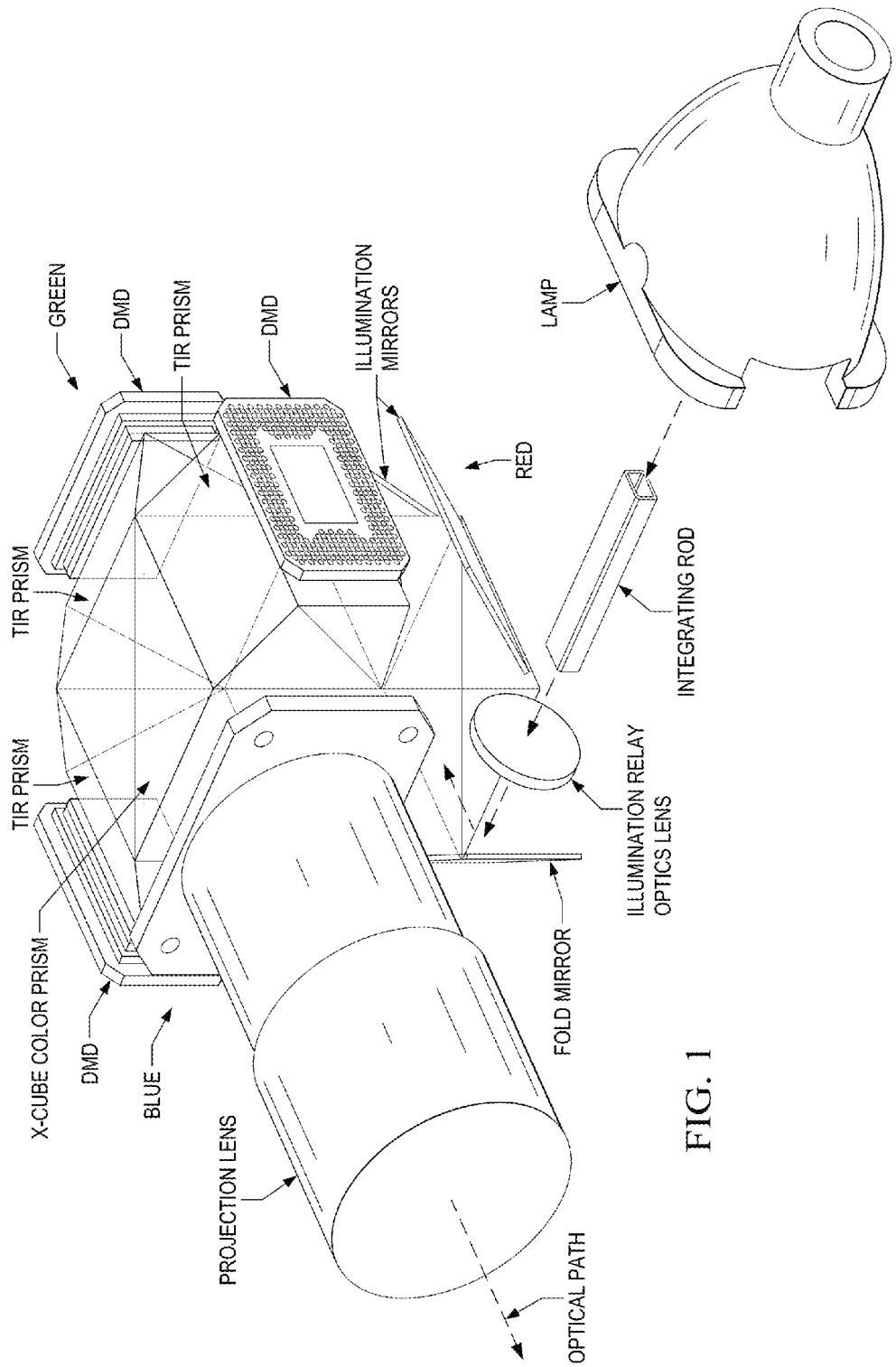
FIGS. 1 and 2 are respective perspective and side views showing the elements of a multi-DMD projection system according to an example embodiment utilizing a TIR architecture.
Figure 2:
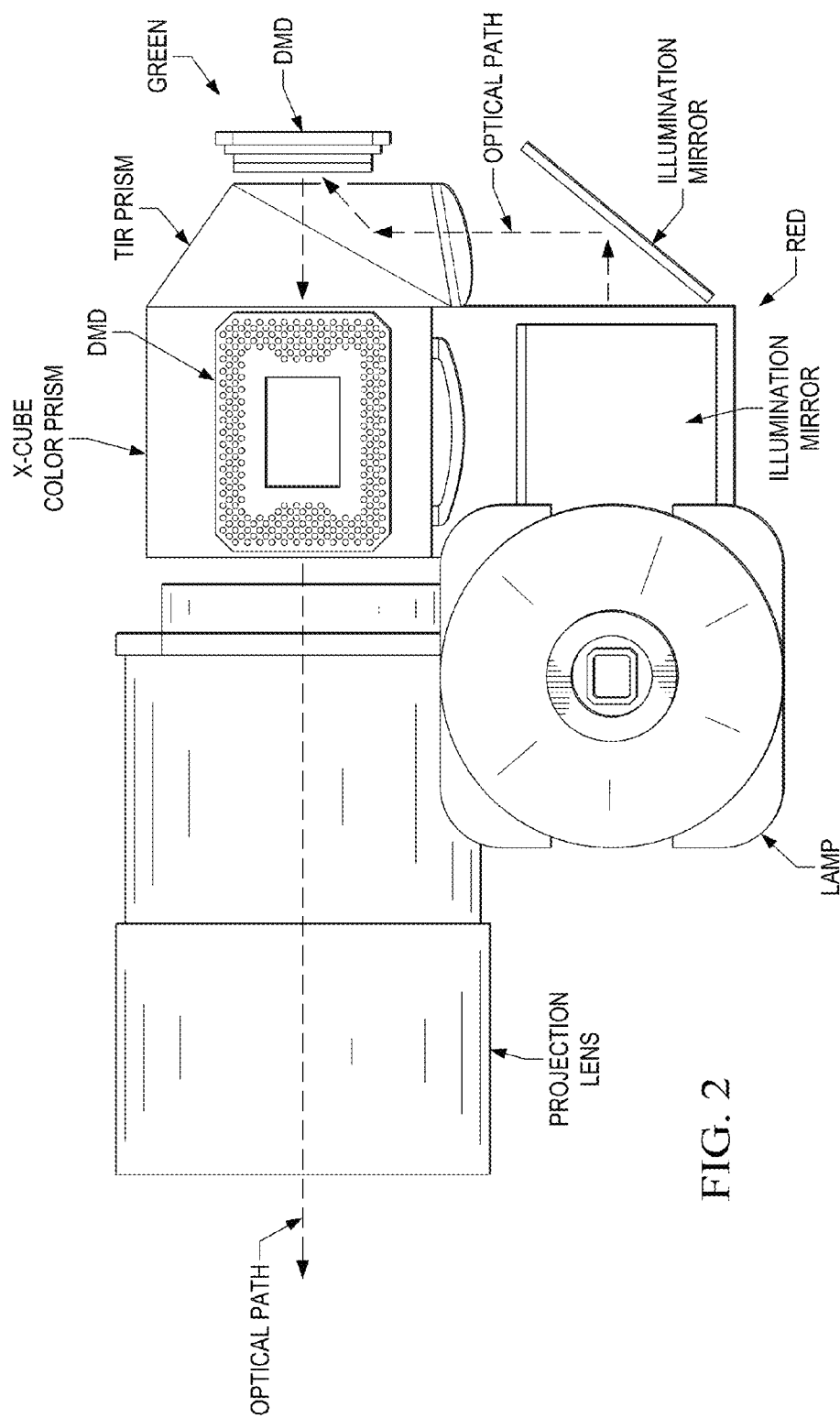
Figure 3:
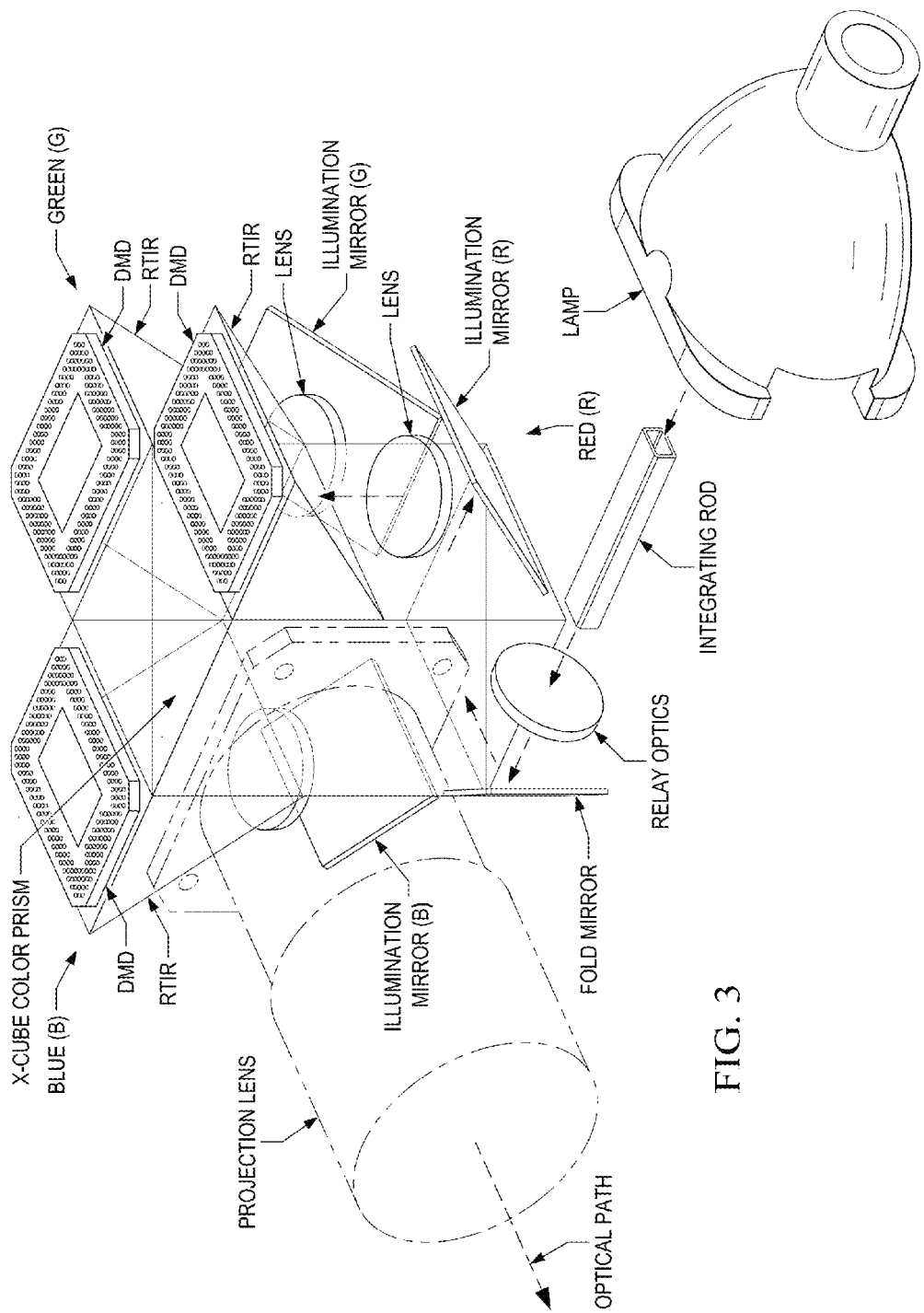
FIGS. 3 and 4 are respective perspective and side views showing the elements of a multi-DMD projection system according to an example embodiment utilizing an RTIR architecture.
Figure 4:
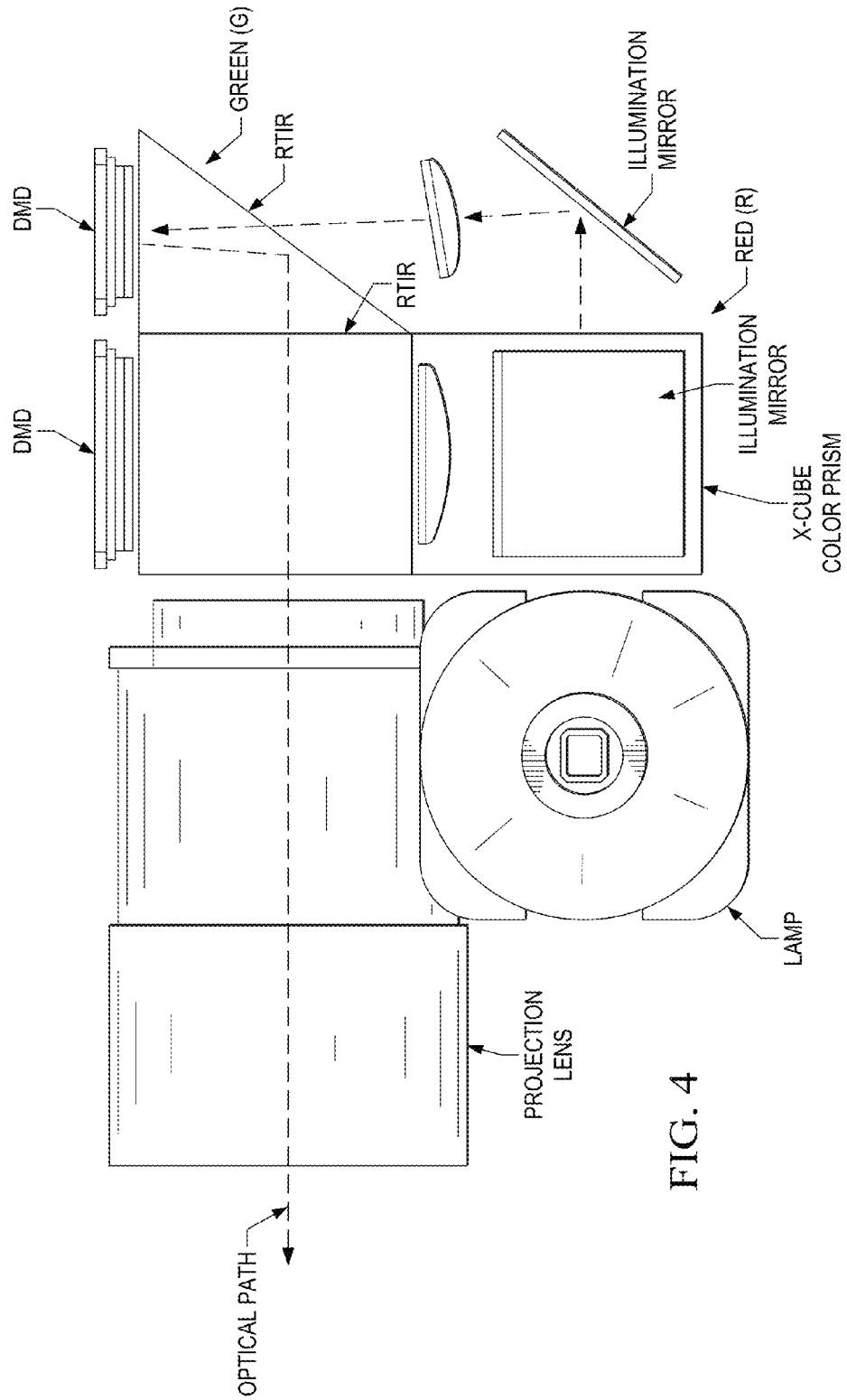
Figure 5:
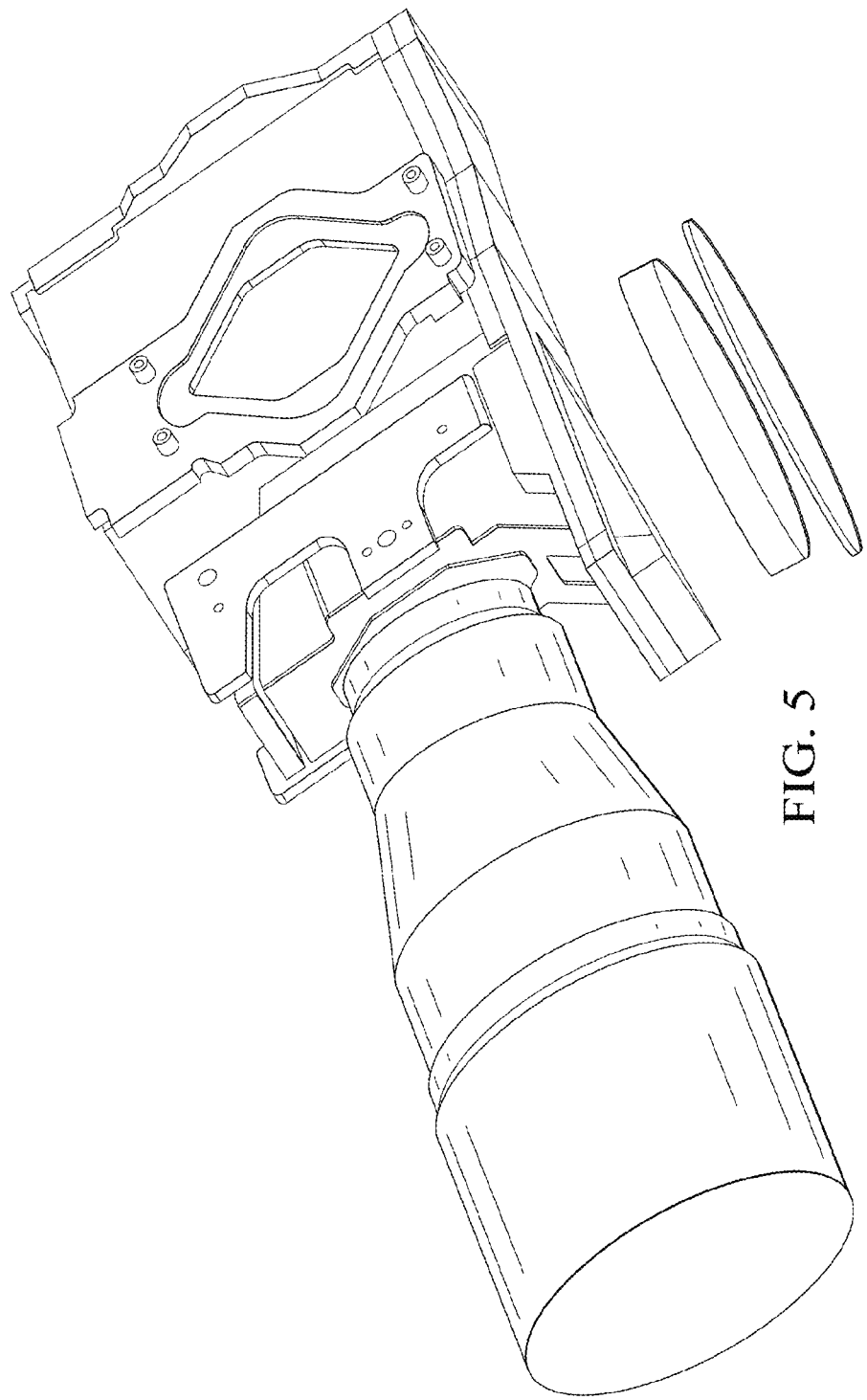
FIGS. 5 and 6 illustrate more detailed implementation examples.
Figure 6:
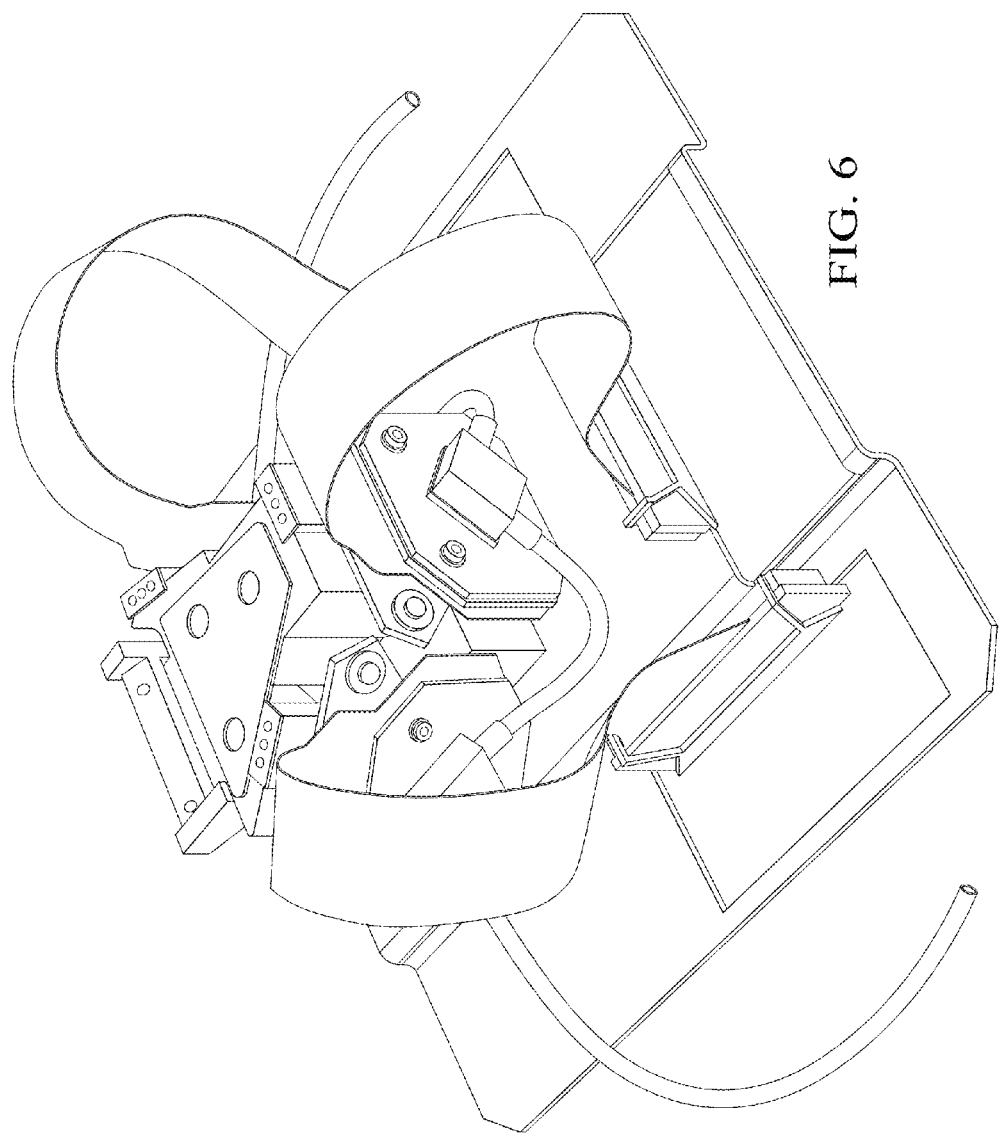
Figure 7:
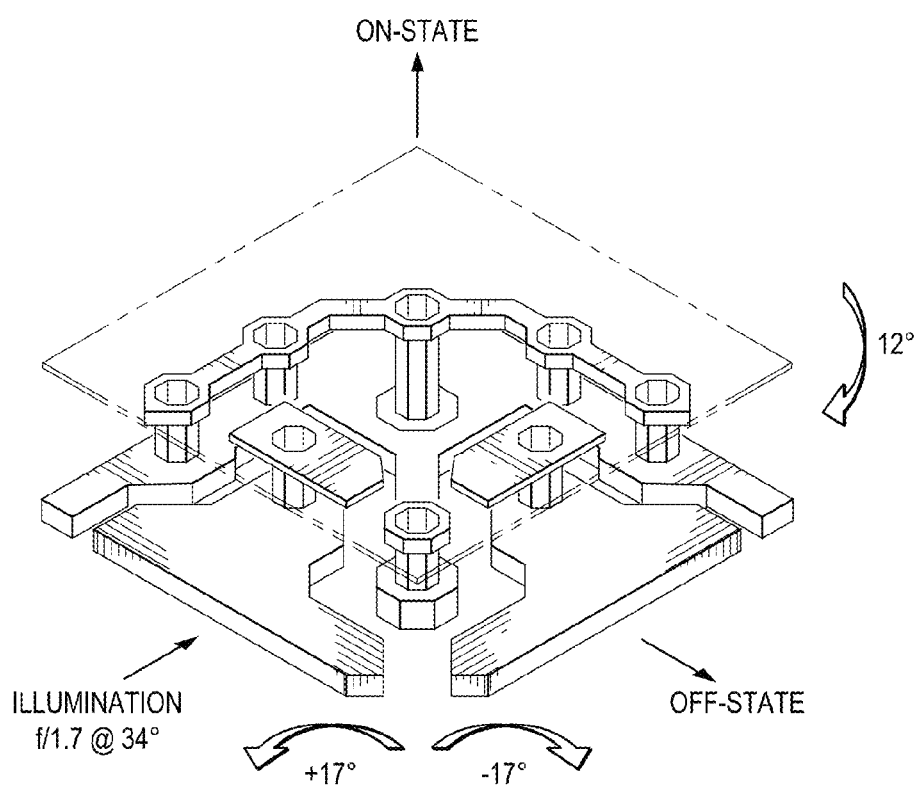
FIG. 7 is a three-dimensional view of a micromirror pixel element.

FIGS. 1 and 2 show the elements of a multi-DMD projection system according to an example embodiment utilizing a TIR architecture. FIGS. 3 and 4 show the elements of a similar system utilizing an RTIR architecture. FIGS. 5 and 6 depict realizable practical implementation examples.

The illustrated design utilizes a property of the new 5.4μ Texas Instruments DLP TRP™ pixel that enables bottom illumination of the micromirror array rather than along the diagonal. By doing so, the illumination light bundles can be folded in the TIR prism across the short dimension of the DMD, allowing a more compact prism with a shorter path length in glass. By placing a TIR prism between the color splitting prism and each DMD, the size, path length, and cost of each TIR prism may be reduced compared to utilizing one large TIR prism to feed white light to the color splitting prism. Also, by placing a TIR prism at each DMD and using bottom illumination, the orientation of each DMD can be the same relative to the color combining prism, enabling use of a conventional X-cube color prism rather than a more complex Philips-type prism.

The illustrated implementation uses an x-cube prism, and avoids an s- and p-polarization color desaturation issue by extending the cube and splitting the white light source with the same prism, but at a different section of the prism such that the illumination path and the projection path do not traverse the same path in the prism. This prevents stray light path issues inherent in a Philips-type prism due to the illumination and the projection paths sharing the same prism space, and enables external clean-up of undesirable leakage light that may contaminate the color gamut. The leakage light can be removed from the split colors by a dichroic filter or dichroic fold mirror external to the prism before directing the split colors into each respective TIR prism for recombining in the projection path. Since the illumination angle into the DMD is set by the TIR prism externally from the color prism, angles-of-incidence (AOI) and cone angles for the illumination path and the projection path may be designed to realize optimum performance of the dichroic color filters.

Since there is only one reflection for blue and red, the path lengths of the X-cube prism for all colors are significantly shorter than for the Phillips prism. Combined with the shorter path length in the projection path for (each) TIR prism enabled by folding the illumination in the short DMD dimension and placing it near each DMD, the overall path length for the projection lens is reduced by approximately ½ that of the Philips-type architecture. This greatly reduces the back working distance required of the projection lens, making it much smaller, lower cost, and less complicated to design since the back working distance more closely matches the lens focal length. Although the height of the X-cube is taller, and it uses three much smaller TIR prisms rather than one very large one, a cost benefit may be achieved in the savings impact to the size, number of elements, and simplicity of design of the projection lens, which is a much more costly component of the total system than any of the illumination elements.

The use of an extended X-cube architecture for the color splitting/recombining prism enables a smaller and less complex engine. Separate paths through the prism are used for illumination color splitting and projection color combining, which avoids the inherent issues of color desaturation using randomly polarized light and orientation of DMDs for odd-numbered reflections in prior X-cube designs and stray light paths of Philips-type prisms when used both as a color splitter and a color combiner in the same space.

The white light source is split into RGB color components in a lower section of the X-cube color prism, whereas the separately modulated components are recombined in an upper section of the X-cube color prism. This separates the optical separation and recombination processes thereby avoiding leakage illumination light getting into the projection path. Polarization induced leakage that crosses the cube filters may be clean-up filtered outside the cube before being directed to the DMD by the TIR or RTIR prisms in bottom illumination. Small TIR or RTIR prisms (one for each DMD) direct the separated RGB components to respective DMDs in bottom illumination mode, minimizing the prism sizes since it folds across the shortest DMD dimension instead of the diagonal, and allows odd reflections in the X-cube projection to be managed by E-W flips instead of DMD right-left-handedness. Also, off-state light is managed by the TIR prisms well before the projection lens, much further away than with Philips-type prism arrangements.

This enables improved contrast. The separately modulated RGB light is combined in the same X-cube, but along a different path. The polarized leakage is not present, so gamut is preserved.

The described examples using multiple chip DMDs having tilt and roll pixels with an X-cube color prism for a white light source application offer advantages of reduced optical path length, reduced cost, better contrast and better thermal management. Individual TIR or RTIR prisms are used between the respective DMDs and the color combining prism instead of one large TIR or RTIR prism between the lens and the color prism. This enables clean-up color filtering for each color, moves the "OFF"-state and flat-state light further away from the projection lens aperture, and eliminates the need for even numbers of reflections in the prism or left- and right-handed DMDs. Light is split and later recombined using the same cube and exactly the same color filters, but in different sections of the prism. This enables polarization induced leakage across the color filters to be eliminated and avoids color gamut de-saturation. The architecture of the tilting and rolling pixel allows bottom illumination, which allows the light path to be folded across the shortest dimension of the DMD (instead of the diagonal as in conventional implementations). This greatly reduces optical path distances to the projection lens by reducing prism sizes, thus reducing lens size and cost. A version using solid state RGB light sources that does not need the lower x-cube splitter can also be implemented.

A micromirror architecture is provided for use in a micromirror array of a digital micromirror device (DMD) spatial light modulator (SLM). Also provided are methods for tilting micromirrors as enabled using the architecture, and chips and display systems employing principles embodied in the architecture.

A disclosed example implementation provides a micromirror with a cantilevered flexure beam that allows rotation about two axes (perpendicular and parallel to beam length). The disclosed example further provides a micromirror with two-axis rotation angles (pitch and roll) that allow a higher composite tilt angle. The disclosed example provides a micromirror that has two stable landed states that are 90° apart (rather than 180° as in dome). The disclosed micromirror has three spring tip contact points, where two are in contact at a time, and only one contact point must be broken to allow a transition from one state to another (viz., transition between "ON" and "OFF" states).

Advantages of the architecture include higher (viz. 17°) tilt angle, added (viz., ~100%) brightness gain (vs. 12° tilt angle prior Manhattan array micromirrors), and enablement of more compact system arrangements.

An example embodiment takes the form of tripoint (TRP) micromirror design with cantilevered flex beam allowing dual-axis mechanical motion and 90-degree switching angles. The example embodiment is shown in FIGS. 7-12.

The design provides distinctions over current micromirror architectures. A higher landed tilt angle (16+ degrees) is provided without a corresponding penalty to hinge dimensions and dynamic (i.e., stiction) performance. The design supports a side-illuminated Manhattan mirror arrangement (without unacceptable degradation to optical contrast). In a side-illuminated Manhattan array, the rotation along two axes avoids contrast loss problems caused with a standard torsion hinge architecture by diffraction from the edge of mirror that is perpendicular to the light source. A high tilt design using the standard "FTP" architecture results in reduced dynamic stiction margin. The TRP architecture at 17-degree composite tilt angle has a dynamic stiction margin equivalent to a 12-degree FTP design.

As shown in FIGS. 7-12, a micromirror structure at each pixel position is formed as a MEMS superstructure over a silicon chip which has been processed using CMOS processing steps to form a memory element below the micromirror structure at each pixel location. The CMOS circuitry comprises transistors (doped silicon), contacts and interconnects (patterned Metal 1, Metal 2 layers).

Figure 8:
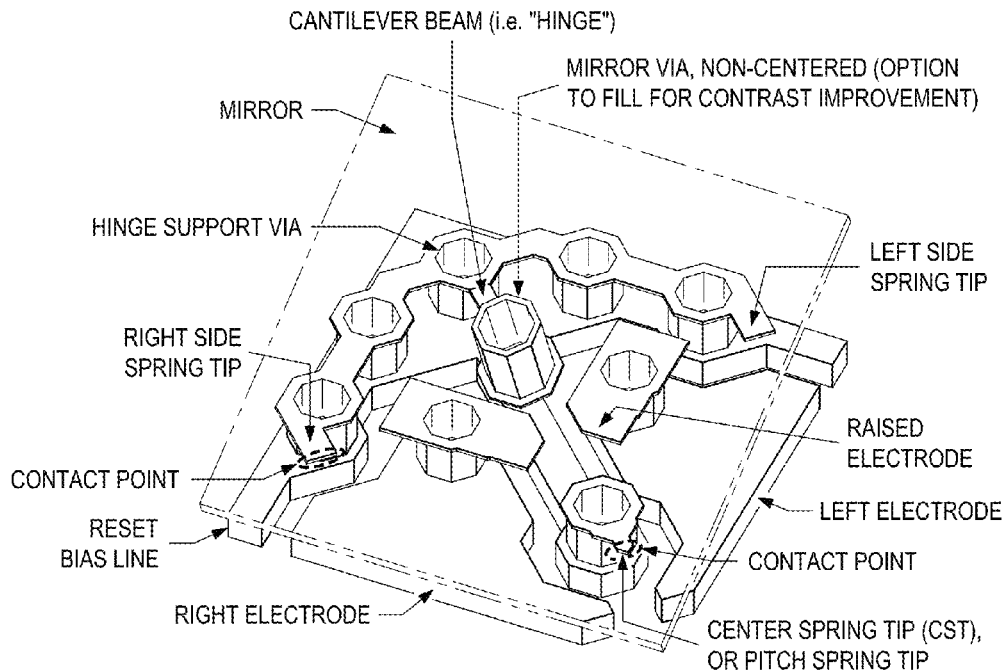
FIG. 8 is a three-dimensional view of the micromirror pixel element of FIG. 7 in a landed state.
Figure 9:
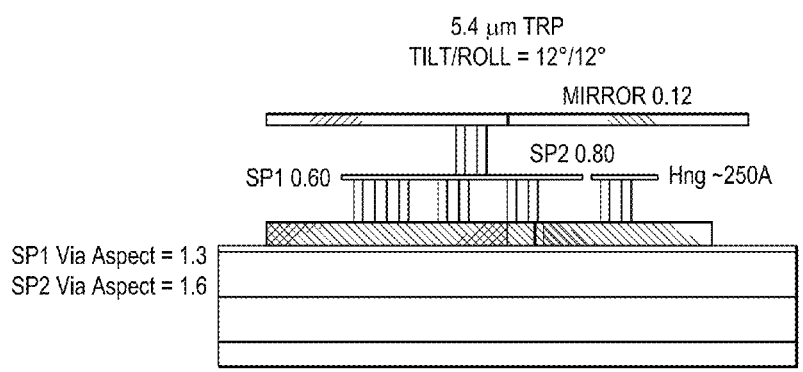
FIG. 9 is a side view of a micromirror pixel element.
Figure 10:
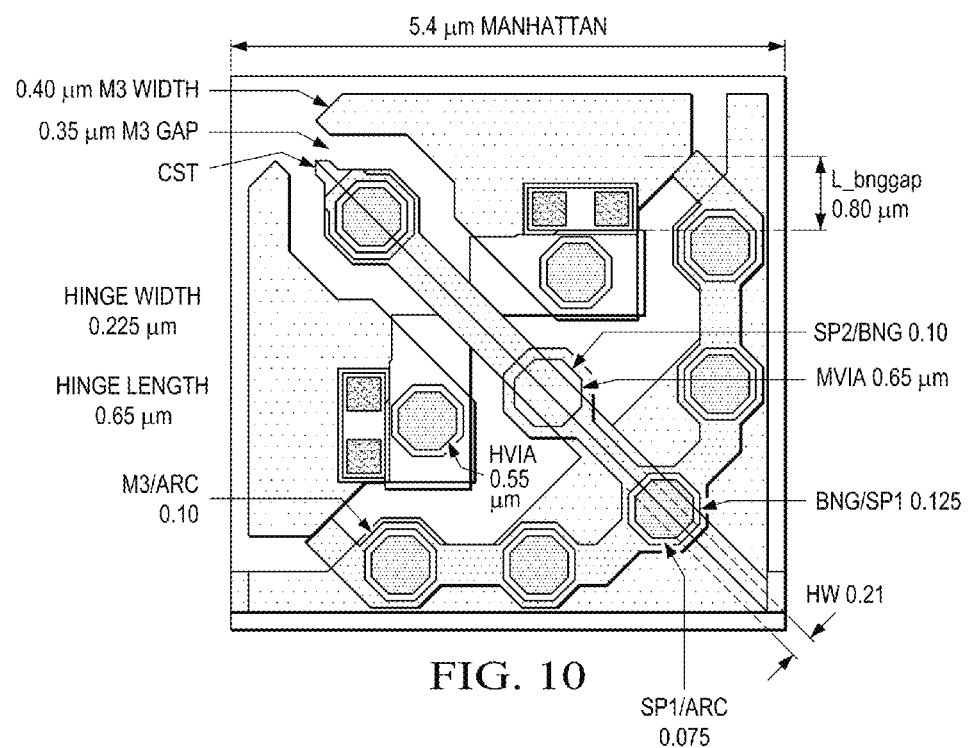
FIG. 10 is a top view of a micromirror pixel element.
Figure 11:
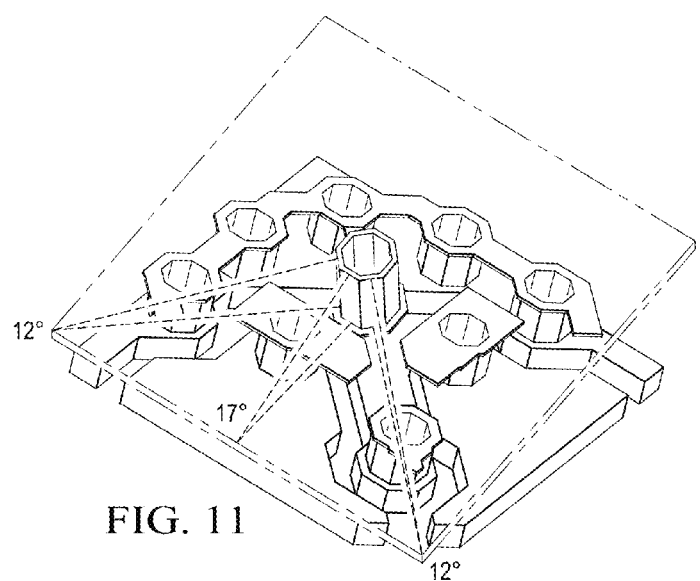
FIGS. 11 and 12 are three-dimensional views of a micromirror pixel element.
Figure 12:
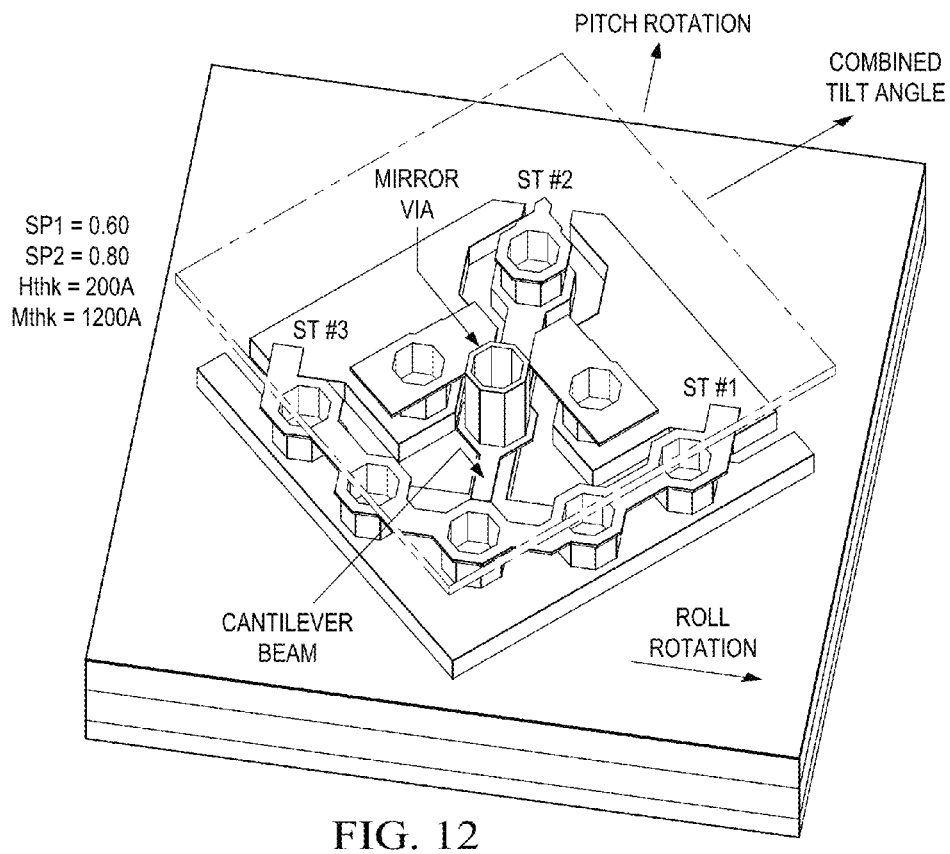

Contacts to the underlying CMOS circuitry, metal electrode address pads, and reset bias line elements are formed through deposition and patterning of a conductive layer (one or more layers of metal; Metal 3). As shown in FIGS. 8 and 10, the MEMS structure is formed within a generally rectangular (viz., square) horizontal area, and an array of micromirrors may be placed in adjacent positions forming a Manhattan-type array. The reset bias line assumes an anchor or cross-bow shape (as viewed from above) in the horizontal plane, including a pointed bulk section occupying a corner of the rectangle and having an internal extent stretching diagonally across the rectangle from about midway of one side to midway of an adjacent side. Narrower elongations extend out from the bulk section to the next corner along each one of the respective adjacent sides, and another narrower elongation extends centrally out from the bulk section along the diagonal of the rectangle from the corner occupied by the bulk to a position just short of the diagonally opposite corner. The side elongations include widened portions along their lengths which serve as landing sites for hinge level spring support vias to be formed later. The diagonal elongation includes a widened portion to serve a similar purpose adjacent its distal end (end closest to the opposite corner). Right and left address electrodes are formed within the same plane, in the spaces between the side and central reset bias line extensions. An outer portion of each electrode is generally aligned with a respective side of the rectangle, not spanned by the reset bias line. An inner portion of each electrode is located proximate a respective side of a juncture of the reset bias line central extension with the bulk section. The right and left electrodes are laterally spaced from the reset bias line, providing sufficient electrical isolation to enable the electrodes and bias line to reach different potentials.

A torsion hinge (spring) with right and left spring tip extensions, a central spring tip along the diagonal, and right and left raised address electrodes are formed through deposition and patterning of a next conductive layer (FIG. 8). This can be accomplished by forming and patterning a first sacrificial layer (e.g., photoresist) over the previously patterned conductive layer that configures the reset bias line, right electrode and left electrode. The first sacrificial layer patterning includes the formation of via openings. A layer of hinge forming material (one or more layers of metal; Metal 4) is then deposited over the patterned first sacrificial layer including conformally within the via openings. The deposited hinge layer is then patterned to define the lateral contours of the torsion hinge, the central spring tip, and right and left raised electrodes. The defined torsion hinge has a truncated anchor or crossbow shape, with a generally arcuate contoured bulk section extending over the reset bias line bulk section and at least partially over the right and left side extensions of the reset bias line. The torsion hinge also has a cantilevered beam section that extends centrally from the hinge bulk section diagonally in alignment above and for a portion of the length toward the opposite corner of the reset bias line central extension. The hinge bulk section is supported in contact above the reset bias line bulk section by a hinge support via proximate the corner occupied by the reset bias line bulk section, and one or more via supports spaced along the adjacent sides. FIG. 8 illustrates an example implementation with the arcuate section supported by five support vias: one proximate the corner, one proximate each respective juncture of the inner part of the reset bias line bulk section with the adjacent sides, and one over each widened portion of a respective right or left reset bias line side extension. The cantilevered beam section is supported at its outer end by the corner hinge support via, but remains unsupported at its inner end. The inner end includes a widened area portion left suspended that serves as a landing site for a later formed mirror support via. Each extremity (furthest portion relative to the corner) of the arcuate section defines a spring tip that extends freely beyond a respective support via over the widened portion of the respective underlying bias line side extension.

The patterning of the layer of hinge forming material also defines a third spring tip, and right and left raised electrodes. The third spring tip element is formed supported by a support via that joins the underlying widened landing site provided by the diagonally extending central elongation of the bias line. It is laterally spaced from the widened portion of the hinge cantilever beam by an amount sufficient to prevent non-interference with the flexure movement of the beam. An extreme end of the third spring tip element juts out from the associated via support toward the opposite corner (corner which the bias line central elongation stops short of) and defines a center spring tip (or pitch spring tip). The center spring tip and the two spring tips provided at the extremities of the hinge arcuate section serve as the three contact points for control of movement during operation of tilting and rolling of the pixel mirror. The right and left raised electrodes are formed respectively supported by support vias over the inner portions of the underlying right and left electrodes. The support vias provide conductive communication with the underlying electrodes, so that the potential at the raised electrodes can be selectively set via respective potentials established at the underlying electrodes. Likewise, the hinge beam potential is electrically communicated via its support vias for establishment of a same potential as the potential applied to the underlying bias line. The right and left raised electrodes and hinge elements are all spaced and sufficiently isolated to allow different potentials to be set independently for each of them.

A mirror and support for the mirror are formed through deposition and patterning of a next conductive layer. This can be accomplished by forming and patterning a second sacrificial layer (e.g., photoresist) over the previously patterned hinge forming material layer that defines the cantilever hinge, spring tip and raised electrode elements. The second sacrificial layer is patterned to include a central via opening (shown as non-centered relative to the rectangle but in other embodiments might be centered) over the free end landing site defined by the widened portion of the cantilever beam. A layer of mirror forming material (one or more layers of metal; Metal 5) is formed over the patterned second sacrificial layer, and patterned to form a reflective element (in the example, a rectangular-shaped mirror). The mirror forming material extends into the central via opening to define a support for the mirror (mirror via). To provide flatness, the upper surface of the second sacrificial layer may be planarized (e.g., using chemical-mechanical polishing) prior to deposition of the mirror forming material. The first and second sacrificial layers provide support to the hinge and mirror forming layers during fabrication and are subsequently removed (viz., wet etched) to release ("free") the hinge and mirror following formation.

Figure 16:
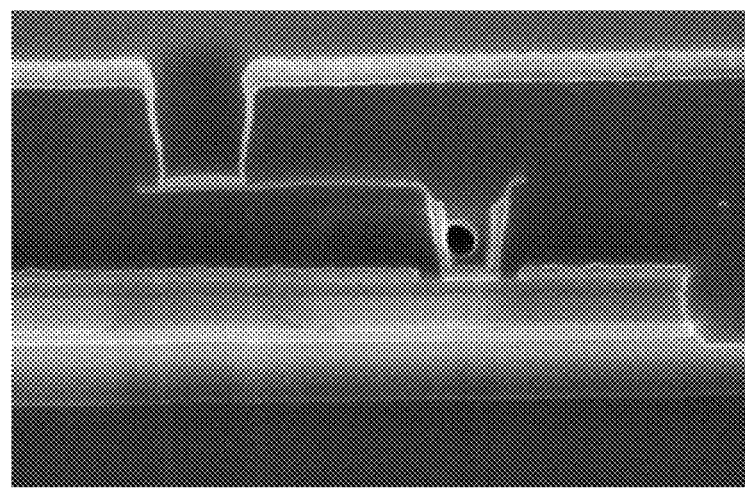
FIG. 16 is a cross-sectional view showing the structure of FIG. 8 on a section passing through the diagonal of the rectangle, in line with the longitudinal axis of the cantilever beam.

FIG. 16 is a cross-sectional view showing the structure of FIG. 8 on a section passing through the diagonal of the rectangle, in line with the longitudinal axis of the cantilever beam. FIG. 16 illustrates the hinge support via (right lower smaller via) proximate the corner of the rectangle supporting the hinge cantilever beam, and the mirror supported by the mirror via (left upper larger via) above the free end of the beam.

Figure 13:
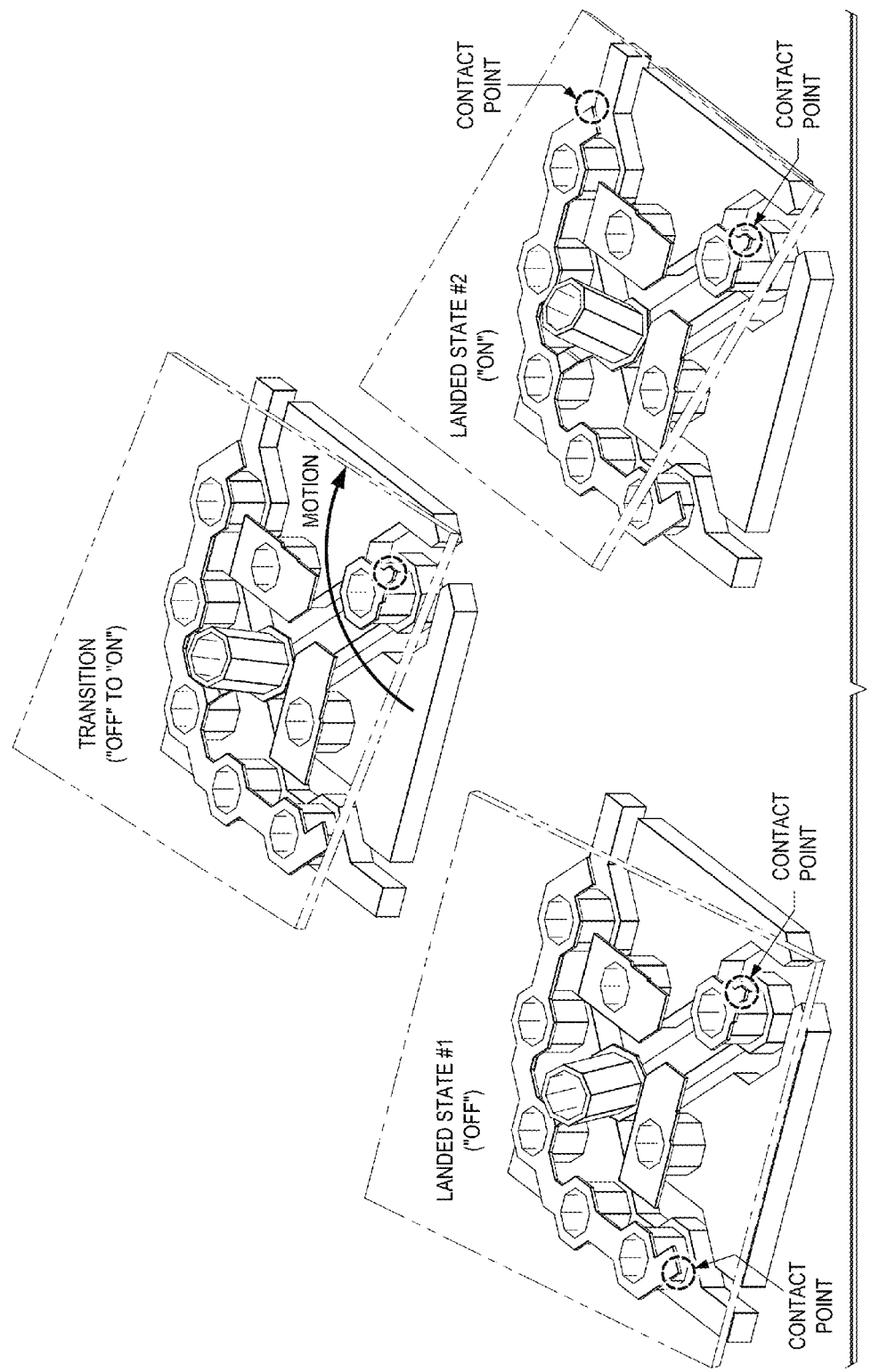
FIG. 13 illustrates end and intermediate orientations of the mirror.
Figure 14:
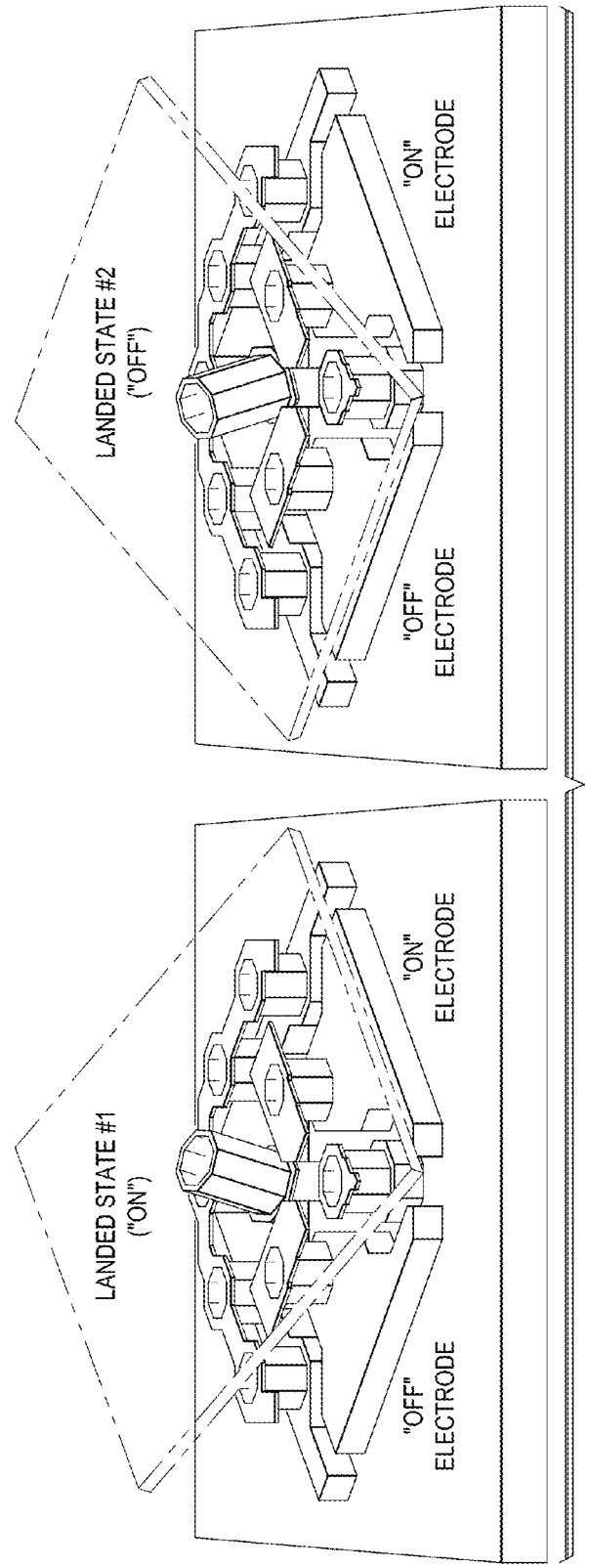
FIGS. 14 and 15 are three-dimensional views of the micromirror pixel element in the "on" and "off" states.
Figure 15:
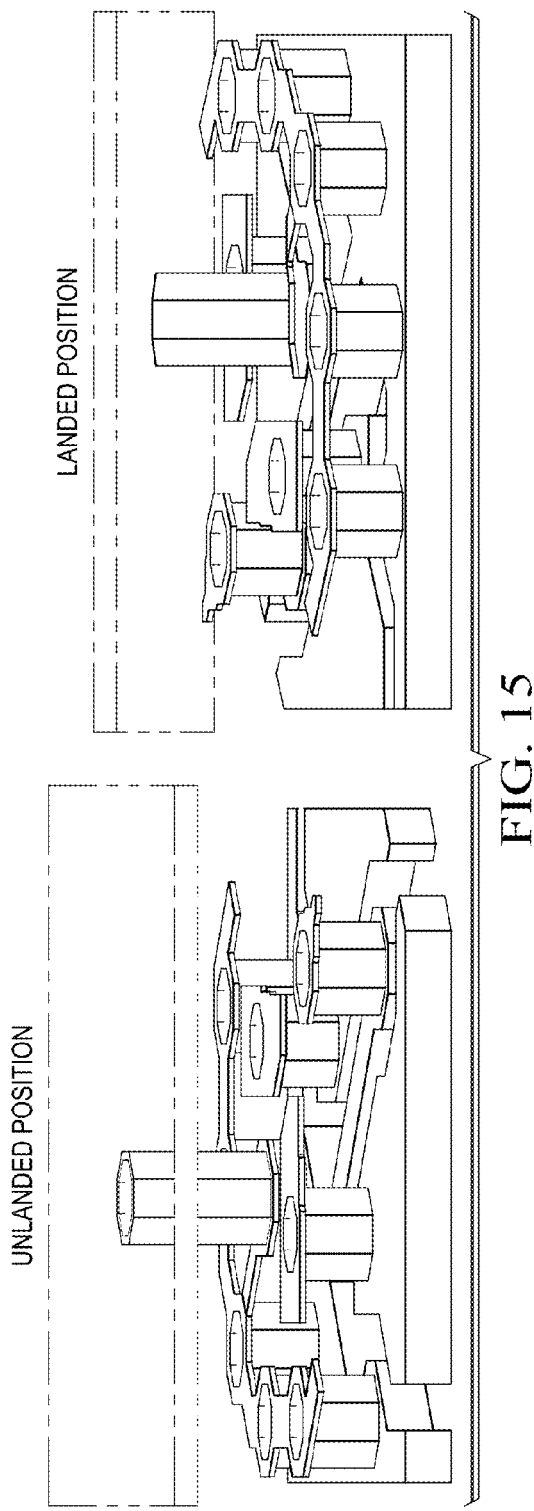

In operation, the mirror undergoes pitch and roll rotations in movement between "ON" and "OFF" positions, responsive to selective application of activation bias and electrode voltage potentials to the reset bias line and to the right and left electrodes. FIG. 13 illustrates end and intermediate orientations of the mirror in the tilting and rolling motion between a first ("OFF") landed state (also shown in FIGS. 8 and 11) and a second ("ON") landed state. As shown, in the first landed state ("OFF" position shown in left view in FIG. 13) the mirror is tilted down and toward the right electrode, with an underside of the mirror resting on contact points provided by the right side and center spring tips. In the intermediate position, the mirror is lifted up and rolled (in the direction of the arrow in the intermediate position shown in the middle view in FIG. 13) away from the right electrode and over toward the left electrode. Then, in the second landed state ("ON" position shown in the right view in FIG. 13) the mirror is tilted down and toward the left electrode, with an underside of the mirror resting on contact points provided by the left side and center spring tips. The landed and unlanded positions are illustrated also in FIGS. 14 and 15.

Figure 17:
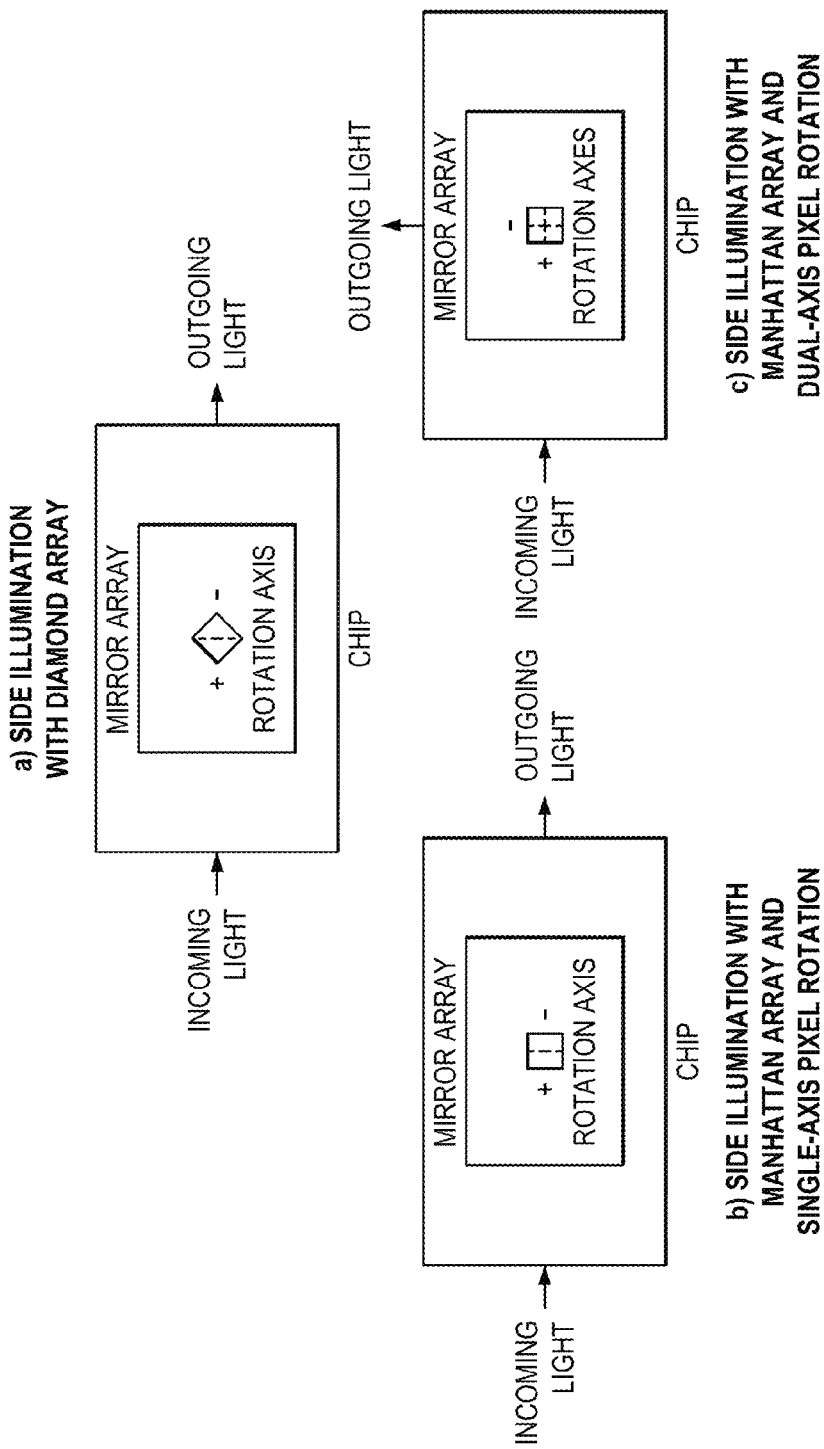
FIG. 17 illustrates the illumination path for the diamond array single axis, Manhattan array single axis; and the Manhattan array dual axis approaches.

In departure from conventional mirrors, it will be observed with reference to FIG. 17, that the combined tilt and roll action of the novel architecture involves in a rotation about two axes, not just one axis, with the mirror moving from a first landed state with one edge tilted down to a second landed state with an adjacent edge, not an opposite edge, tilted down. Thus, with the mirror, the outgoing light for mirrors arranged on a chip in a Manhattan-type array can be directed at 90 deg. to the incoming light, as shown in the bottom right view in FIG. 17. This differs significantly from the previously described conventional single axis tilting (only) mirrors arranged in either the Manhattan-type or diamond array, for which the outgoing light is directed in the same direction as the incoming light, as shown in the top and bottom left views in FIG. 17.

Figure 18:
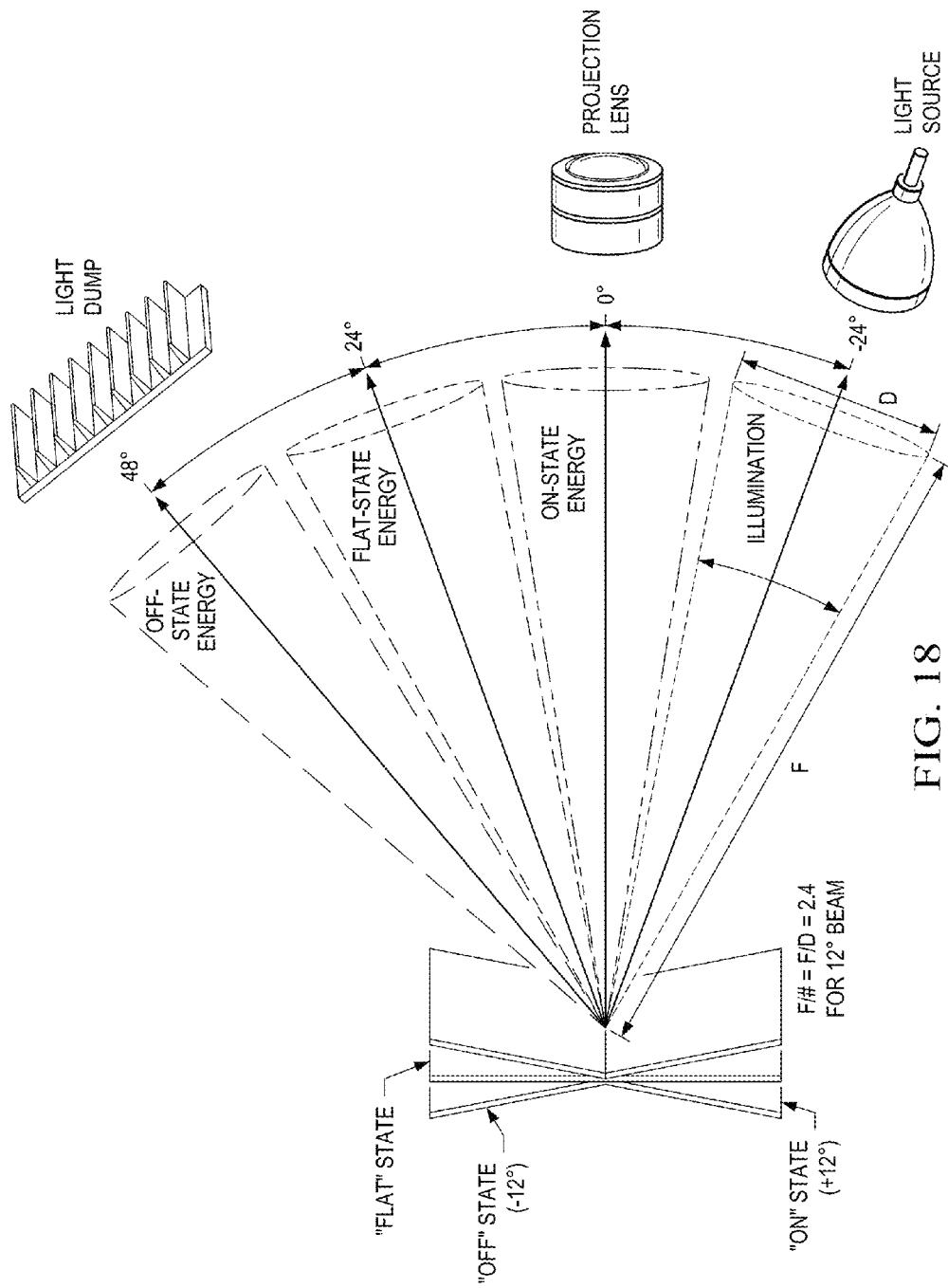
FIG. 18 is a schematic of the optical path for a micromirror pixel.
Figure 19:
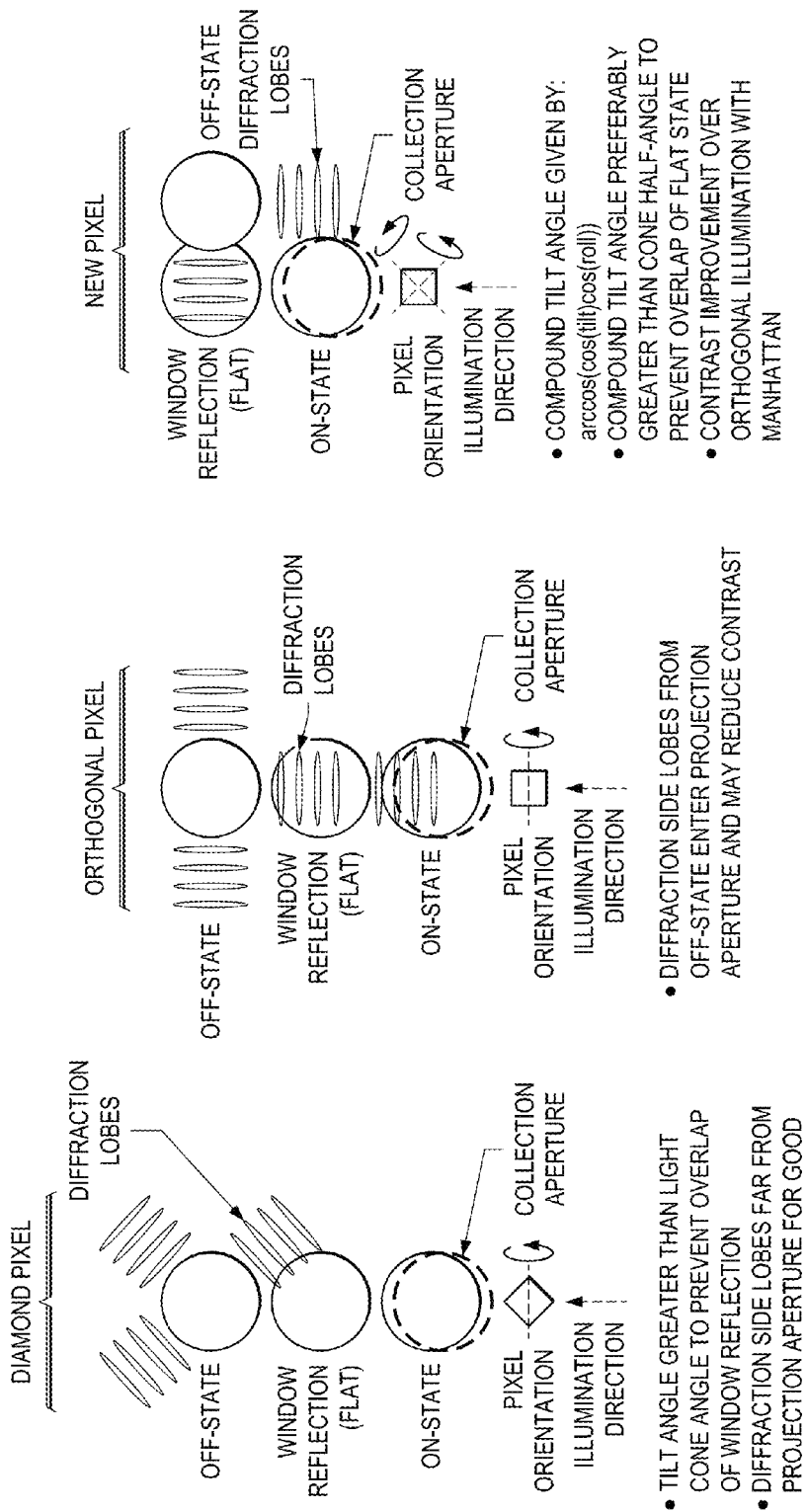
FIG. 19 is a top view of the optical path for various pixels.

The structure also offers advantages of increased contrast and reduced "OFF"-state light interference as can be seen in the different light states illustrated in FIGS. 18 and 19.

Those skilled in the art will appreciate that modifications may be made to the described example embodiments, and also that many other embodiments are possible, within the scope of the disclosed principles.

What is claimed is:

1. A multi-DMD projection system, comprising:
   a light source;
   three digital micromirror device (DMD) spatial light modulators having bottom-illuminated tilt-and-roll pixels, each pixel having a respective mirror supported by a hinge that allows the mirror to rotate between: a first stable landed state in which the mirror rests upon a first contact point and upon a second contact point, but not upon a third contact point; and a second stable landed state in which the mirror rests upon the second contact point and upon the third contact point, but not upon the first contact point;

three total internal reflection (TIR) prisms;
three light directing elements;
a projection lens; and
an X-cube color splitting/recombining prism having upper and lower sections, and front, rear, left and right side faces;
the light source, the DMD spatial light modulators, the TIR prisms, the light directing elements, the projection lens and the X-cube prism being relatively positioned and configured so that:
light from the light source is: directed into the front side face at a first one of the upper and lower sections of the X-cube prism ("first section"); and split by the X-cube prism into three colors that are respectively directed out of the left, rear and right side faces at the first section ("illumination light");
outside of the X-cube prism, the light directing elements respectively direct the three colors to corresponding respective ones of the three DMD spatial light modulators for modulation;
the TIR prisms respectively direct the three colors after modulation from the bottom-illuminated tilt-and-roll pixels of the three DMD spatial light modulators ("projection light") into corresponding respective ones of the left, rear and right side faces at a second one of the upper and lower sections of the X-cube prism ("second section"); and
the modulated colors from the TIR prisms are recombined at the second section, and the combined light is directed out of the front side face at the second section and projected by the projection lens;
wherein the illumination light and the projection light traverse different paths from one another within the X-cube prism to avoid polarization induced leakage and color desaturation.

2. A projection method, comprising:
directing light from a light source into a front side face at a first one of upper and lower sections of an X-cube prism ("first section"), the light being split by the X-cube prism into three colors that are respectively directed out of left, rear and right side faces of the X-cube prism at the first section ("illumination light");
outside of the X-cube prism, respectively directing the three colors to corresponding respective ones of three digital micromirror device (DMD) spatial light modulators for modulation;
using three total internal reflection (TIR) prisms to respectively direct the three colors after modulation from bottom-illuminated tilt-and-roll pixels of the three DMD spatial light modulators ("projection light") into corresponding respective ones of the left, rear and right side faces at a second one of the upper and lower sections of the X-cube prism ("second section"), each pixel having a respective mirror supported by a hinge that allows the mirror to rotate between: a first stable landed state in which the mirror rests upon a first contact point and upon a second contact point, but not upon a third contact point; and a second stable landed state in which the mirror rests upon the second contact point and upon the third contact point, but not upon the first contact point;
at the second section, recombining the modulated colors from the TIR prisms;
directing the combined light out of the front side face at the second section; and
projecting the combined light from the second section by a projection lens;
wherein the illumination light and the projection light traverse different paths from one another within the X-cube prism to avoid polarization induced leakage and color desaturation.

3. The system of claim 1, wherein the TIR prisms are reverse TIR prisms.

4. The method of claim 2, wherein the TIR prisms are reverse TIR prisms.

* * * * *